Figure 4:
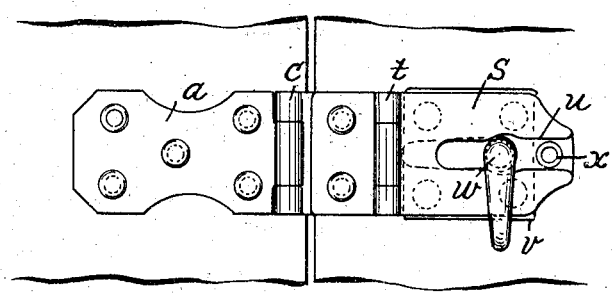

No. 768,195. PATENTED AUG. 23, 1904.
J. J. QUACKENBUSH.
SHUTTER FASTENER.
APPLICATION FILED MAR. 25, 1904.
NO MODEL. 2 SHEETS—SHEET 1.
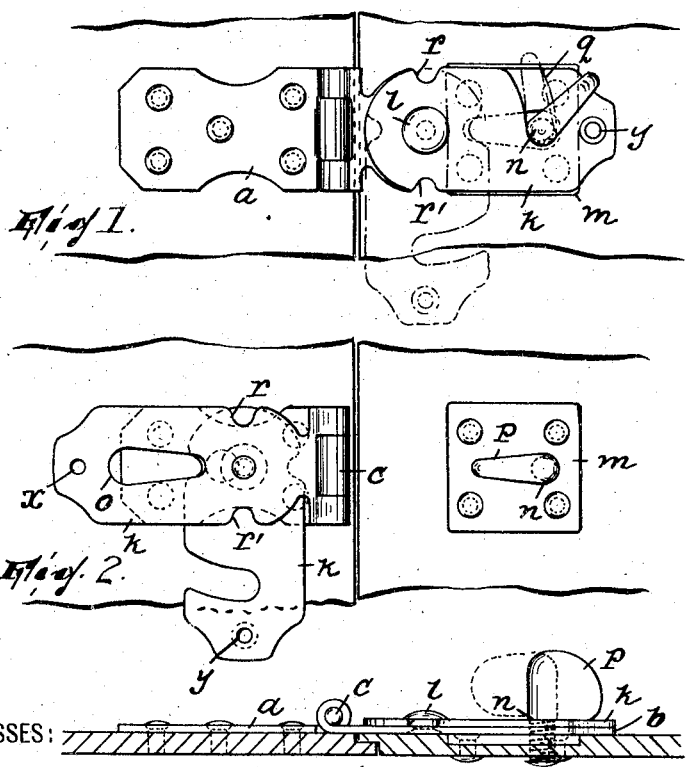
WITNESSES:
Wm. Bell.
Robert J. Pollitt
INVENTOR,
John J. Quackenbush,
BY
Gartner Steward,
ATTORNEYS.

No. 768,195. PATENTED AUG. 23, 1904.
J. J. QUACKENBUSH.
SHUTTER FASTENER.
APPLICATION FILED MAR. 25, 1904.
NO MODEL. 2 SHEETS—SHEET 2.

WITNESSES: INVENTOR,
Wm. S. Bell. John J. Quackenbush,
Robert J. Pollitt. BY
Gastner & Seward,
ATTORNEYS.

No. 768,195.

Patented August 23, 1904.

UNITED STATES PATENT OFFICE.

JOHN J. QUACKENBUSH, OF LAKEVIEW, NEW JERSEY.

SHUTTER-FASTENER.

SPECIFICATION forming part of Letters Patent No. 768,195, dated August 23, 1904.

Application filed March 25, 1904. Serial No. 199,977. (No model.)

*To all whom it may concern:*

Be it known that I, JOHN J. QUACKENBUSH, a citizen of the United States, residing in Lakeview, in the county of Passaic and State of New Jersey, have invented certain new and useful Improvements in Burglar-Proof Shutter-Fasteners; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to means for securing blinds or the like in closed position; and it has for its principal object to so construct a hasp that it will confuse and deceive one attempting to surreptitiously manipulate it without being able to visually determine its construction and operation.

My improved locking device is shown in the drawings as applied to surfaces which when in the position for locking stand in substantially the same plane; but it will be understood that said locking device is adapted to be attached to surfaces which when in the position referred to stand at right angles, as in the case of a blind or the like and its casing.

The invention will be found fully illustrated in the accompanying drawings, wherein—

Figure 5:
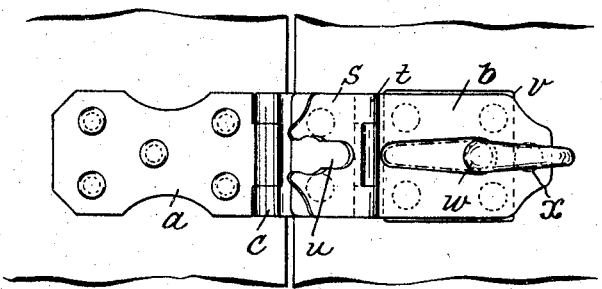

Figure 1 shows one form of the invention with the parts arranged in locking position. Fig. 2 shows the same form of the invention as is shown in Fig. 1, with the locking-plate in unlocking position and the hinged leaf thrown back. Fig. 3 is a view in side elevation of what is shown in Fig. 1. Fig. 4 shows another form of the invention with the parts arranged in locking position. Fig. 5 shows that form of the invention which is illustrated in Fig. 4, with the locking-plate arranged in the unlocking position, the parts being otherwise arranged, as in Fig. 4; and Fig. 6 shows that form of the invention illustrated in Fig. 4 with the locking-plate in unlocking position and the hinged leaf of the hasp thrown back.

An ordinary hasp is shown in all the figures of the drawings, where $a$ is its fixed leaf, and $b$ its hinged leaf, pivoted together at $c$ in the usual manner.

In the form of the invention shown in Figs. 1, 2, and 3 a locking-plate $k$ is hinged on a pivot $l$ on the hinged leaf $b$ in the same manner that the locking-plate $e$, above described, is hinged on the pivot $d$. The securing-piece in this instance comprises a plate $m$ and a turn-button $n$, which is screwed into the plate and which when turned into a position coincident with the slot $o$ of the hinged leaf of the hasp permits the latter to pass over the head $p$ of said turn-button $n$. The locking-plate has in this instance a single slot $q$ extending in from one side thereof and arranged concentric with the pivot $l$. A recess $r$ is formed in the side of the locking-plate $k$ in such disposition that when the plate is turned sufficiently said recess will approximately coincide with the end of slot $o$. Such recess, therefore, only permits the parts to come into the position shown in Fig. 1 upon the locking-plate being made to first assume this position.

Figure 6:
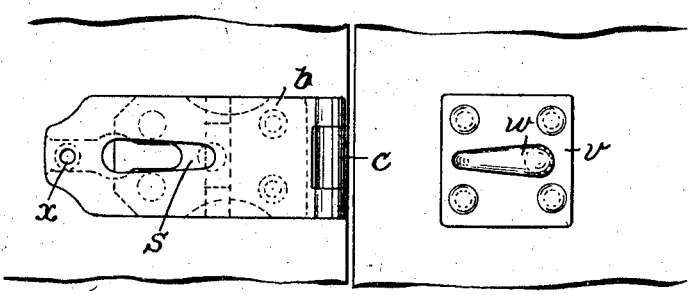

In that form of the invention shown in Figs. 4, 5, and 6 the locking-plate $s$ is pivoted on the hinged leaf $b$ of the hasp at $t$ on an axis which extends parallel with the axis of the hinge $c$ of the hasp. The locking-plate is formed in this instance with a longitudinal slot $u$, extending in from its free end. The securing-piece comprises a plate $v$ and a turn-button $w$, the same as the corresponding parts in Figs. 1, 2, and 3.

The principal object of this invention being to deceive and confuse one surreptitiously attempting to manipulate the device, I prefer to make the locking-plate, whatever its form, and the hinged leaf of the hasp with configurations which more or less precisely conform, so far as they extend, with each other, as will be seen upon perusing any of the figures of the drawings. To one attempting to manipulate the device to unlock it without being able to observe its construction, as in the case of a burglar who has removed only enough of the slats of a blind to admit one hand, this formation of the parts will afford confusion and materially embarrass his operations. To further the deception in the case of the form of the invention shown in Fig. 1, the side of the plate $k$ opposite to the recess $r$ may have a corresponding recess $r'$, the outline of the hinged leaf of the hasp being at this point correspondingly formed.

In those forms of the invention shown in Figs. 1 to 6, inclusive, the securing of the parts together and the avoiding of looseness are accomplished by the use of a turn-button, such as that shown, which can be screwed down tight against the parts with which it directly engages, as shown in Fig. 3.

In order that the hinged leaf of the hasp may be secured down permanently, as when the blind is to remain closed for long periods, I provide the hinged leaf of the hasp near the end with a hole $x$ and the locking-plate with a coinciding hole $y$, (in all forms of the invention except that shown in Figs. 4, 5, and 6, where the slot $u$ will coincide with the hole $x$.) These holes are adapted to receive a securing-screw or the like.

Having thus fully described my invention, what I claim as new, and desire to secure by Letters Patent, is—

The combination, with a hinged hasp, of a turn-button, a suitable mounting for the turn-button, and a locking-plate pivotally arranged on the hinged leaf of the hasp, said hinged leaf of the hasp and the locking-plate having substantially corresponding slots and said locking-plate being movable to bring its slot into coincidence with that of the hinged leaf so as to admit the turn-button, substantially as described.

In testimony that I claim the foregoing I have hereunto set my hand this 24th day of March, 1904.

JOHN J. QUACKENBUSH.

Witnesses:
JOHN W. STEWARD,
ROBERT J. POLLITT.